(12) United States Patent
Pramod et al.

(10) Patent No.: US 11,180,186 B2
(45) Date of Patent: Nov. 23, 2021

(54) DISTURBANCE FEEDFORWARD COMPENSATION FOR POSITION CONTROL IN STEERING SYSTEMS

(71) Applicant: STEERING SOLUTIONS IP HOLDING CORPORATION, Saginaw, MI (US)

(72) Inventors: Prerit Pramod, Saginaw, MI (US); Kai Zheng, Midland, MI (US); Mariam Swetha George, Midland, MI (US); Tejas M. Varunjikar, Troy, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 162 days.

(21) Appl. No.: 16/376,116

(22) Filed: Apr. 5, 2019

(65) Prior Publication Data
US 2019/0308659 A1 Oct. 10, 2019

Related U.S. Application Data

(60) Provisional application No. 62/653,061, filed on Apr. 5, 2018.

(51) Int. Cl.
*B62D 5/04* (2006.01)
(52) U.S. Cl.
CPC ......... *B62D 5/0463* (2013.01); *B62D 5/0481* (2013.01)
(58) Field of Classification Search
CPC .... B62D 5/0463; B62D 5/0481; B62D 6/002; B62D 15/025; B62D 5/0442; B62D 3/126
See application file for complete search history.

(56) References Cited

U.S. PATENT DOCUMENTS 5,032,995 A * 7/1991 Matsuda ............ B60K 23/0808
701/29.2
5,912,539 A * 6/1999 Sugitani ................ B62D 5/049
318/434
(Continued)

FOREIGN PATENT DOCUMENTS

CN 101716951 A 6/2010
CN 102837736 A 12/2012
(Continued)

OTHER PUBLICATIONS

Chinese Office Action and Search Report from the Chinese Patent Office for related Chinese Patent Application No. 201910277667.9, dated May 8, 2021, 8 page(s).
(Continued)

*Primary Examiner* — Mussa A Shaawat
(74) *Attorney, Agent, or Firm* — Dickinson Wright PLLC

(57) ABSTRACT

Technical solutions are described for disturbance feedforward compensation technique for improving the disturbance rejection properties of a closed loop position control system. According to one or more embodiments, a steering system includes a position controller that generates a torque command based on an input rack-position command and a measured position command. Further, a disturbance estimator that estimates a rack force acting on a rack, and an adder generates an adjusted torque command by adding the rack force that is estimated into the torque command. The steering system further includes an actuator that positions the rack according to the adjusted torque command.

20 Claims, 7 Drawing Sheets

(56) References Cited

U.S. PATENT DOCUMENTS

| | | | |
|---|---|---|---|
| 2002/0019690 A1* | 2/2002 | Kurishige | B62D 5/0466 701/41 |
| 2003/0079933 A1* | 5/2003 | Chabaan | B62D 6/10 180/446 |
| 2004/0245041 A1* | 12/2004 | Fukuda | B62D 5/0466 180/444 |
| 2006/0080016 A1* | 4/2006 | Kasahara | B62D 6/001 701/41 |
| 2011/0282552 A1* | 11/2011 | Gebregergis | B62D 5/0418 701/42 |
| 2016/0176440 A1* | 6/2016 | Witte | B62D 6/002 701/23 |
| 2017/0158227 A1 | 6/2017 | Katzourakis et al. | |
| 2018/0334184 A1* | 11/2018 | Jin | B62D 5/0463 |
| 2019/0135331 A1* | 5/2019 | Pramod | B62D 5/046 |
| 2019/0308659 A1* | 10/2019 | Pramod | B62D 15/025 |
| 2019/0372497 A1* | 12/2019 | Gonschorek | H02P 21/0003 |
| 2020/0039576 A1* | 2/2020 | Shoji | B62D 6/002 |
| 2020/0088596 A1* | 3/2020 | Hwang | G01L 5/221 |
| 2020/0108857 A1* | 4/2020 | Tsubaki | B62D 6/00 |
| 2020/0382032 A1* | 12/2020 | Takase | H02P 21/05 |
| 2021/0006188 A1* | 1/2021 | Endo | B62D 5/0421 |
| 2021/0006189 A1* | 1/2021 | Endo | H02P 21/22 |

FOREIGN PATENT DOCUMENTS

| | | |
|---|---|---|
| CN | 104918841 A | 9/2015 |
| CN | 107021133 A | 8/2017 |
| DE | 102005034176 A1 | 3/2006 |
| DE | 102015210283 A1 | 5/2016 |

OTHER PUBLICATIONS

Official Letter from the German Patent and Trademark Office for related German Patent Application No. 102019109006.7, dated Jul. 20, 2021, 12 page(s).

* cited by examiner

DISTURBANCE FEEDFORWARD COMPENSATION FOR POSITION CONTROL IN STEERING SYSTEMS

CROSS-REFERENCES TO RELATED APPLICATIONS

This patent application claims priority to U.S. Provisional Patent Application Ser. No. 62/653,061, filed Apr. 5, 2018, and which is incorporated herein by reference in its entirety.

BACKGROUND

The present application generally relates to steering systems, and particularly addresses technical challenges related to disturbance feedforward compensation for position control in steering systems.

Steering systems used by vehicles can include a position controller that steers a rack according to a position command. Examples of steering systems including such position controller can include a steer by wire system (SbW) that includes a road-wheel actuator (RWA), an electric power steering system (EPS), and the like. The position command can be received by the position controller from a human driver or an autonomous driver, such as in an advanced driving assistance system (ADAS).

SUMMARY

Technical solutions are described for disturbance feedforward compensation technique for improving the disturbance rejection properties of a closed loop position control system. The technical solutions described herein can be employed irrespective of a base position control architecture. Further, the resulting disturbance rejection, compared to typical solutions, has an improved consistency with varying conditions including friction etc. because a real-time estimated rack force is utilized for compensation. Further, the technical solutions described herein facilitate improvement of the disturbance rejection properties and therefore the position tracking performance of the control system.

Technical solutions are described for disturbance feedforward compensation technique for improving the disturbance rejection properties of a closed loop position control system. According to one or more embodiments, a steering system includes a position controller that generates a torque command based on an input rack-position command and a measured position command. Further, a disturbance estimator that estimates a rack force acting on a rack, and an adder generates an adjusted torque command by adding the rack force that is estimated into the torque command. The steering system further includes an actuator that positions the rack according to the adjusted torque command.

According to one or more embodiments, a method includes generating, by a position controller, a torque command based on an input rack-position command. The method further includes estimating, by a disturbance estimator, a rack force acting on a rack. The method further includes generating an adjusted torque command by adding the rack force that is estimated into the torque command. The method further includes positioning, by a motor, the rack according to the adjusted torque command that is applied to the motor.

According to one or more embodiments, a steering system includes a rack, a motor, and a rack positioning system configured to perform a method that includes generating, by a position controller, a torque command based on an input rack-position command. The method further includes estimating, by a disturbance estimator, a rack force acting on a rack. The method further includes generating an adjusted torque command by adding the rack force that is estimated into the torque command. The method further includes positioning, by a motor, the rack according to the adjusted torque command that is applied to the motor.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
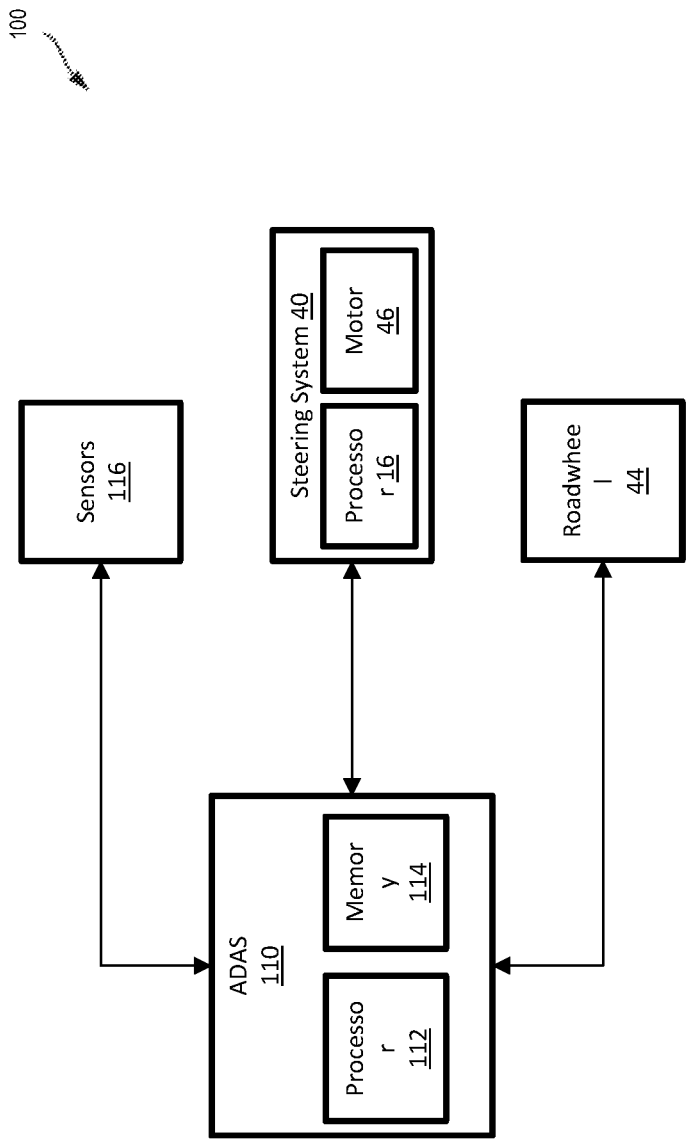
FIG. 1 depicts an advanced driver assistance system in a vehicle according to one or more embodiments.

FIG. 1 depicts an advanced driver assistance system in a vehicle according to one or more embodiments. It will be appreciated that the steering system 40 shown and described can be used in an autonomous or semi-autonomous vehicle or in a more conventional vehicle. In a vehicle 100, an advanced drive assistance system (ADAS) 110 can be coupled with a steering system 40, one or more roadwheels 44 (via one or more control unit), and other control units in the vehicle 100. The ADAS 110 can include one or more processors 112 and one or more memory devices 114.

The ADAS 110 receives one or more input signals including data and/or commands from the control units, such as the controller 16 of the steering system 40. The ADAS 110 can further receive one or more input signals from one or more sensors 116, such as a camera, a radar, a lidar, or any other sensors. The ADAS 110 can further send signals including data and/or commands to the control units, such as a controller 16 of the steering system 40. The ADAS 110 can further receive input from the human driver, such as a destination, one or more preferences and the like.

The ADAS 110 can provide notifications to the driver, such as during an interaction with the driver, and/or in response to one or more conditions in the vehicle 100. The notifications can include audio notifications, visual notifications, haptic notifications, torque notifications, and the like. For example, audio/visual notifications can be sent via a driver-vehicle information unit, speakers equipped in the vehicle 100, and the like. The haptic notifications can be provided via a seat, the steering system 40, and the like. The torque notification can be sent via the steering system 40, for example by generating a torque overlay that is added into an assist torque that is generated for assisting the driver when operating the vehicle 100.

The ADAS 110, in one or more examples, determines a trajectory of travel for the vehicle 100 automatically. The sensors 116 are used to provide several ADAS features that affect lateral motion of the vehicle 100, such as lane keeping assist, lane centering assist, blind-zone assist etc. Such features can help the driver avoid collisions, such as a side-collision, front-collision etc. When providing such functionality, the ADAS 110 assesses the driver's intention, such as acceleration, lane change etc. ADAS features, such as LKA, may rely on sensor-based lane information to detect vehicle proximity to a lane-mark or vehicle's potential to cross into other lane based on lateral movement. However, such information is often delayed with respect to driver input. After the driver applies handwheel torque, there is some delay before vehicle motion is affected, due to physics. For collision avoidance application, such delay is not desirable as it might be too late to predict a potential side collision and apply necessary torque overlay.

Technical solutions described herein facilitate determining a predicted vehicle trajectory faster than sensor based trajectory prediction. For overcome the technical challenges with the sensor based vehicle trajectory prediction, the technical solutions described herein use steering signals, such tbar torque, to predict the vehicle trajectory. The predicted trajectory (or path) can be used to identify the driver's intentions and act, if needed, to mitigate a potential collision (side, front etc.).

Figure 2:
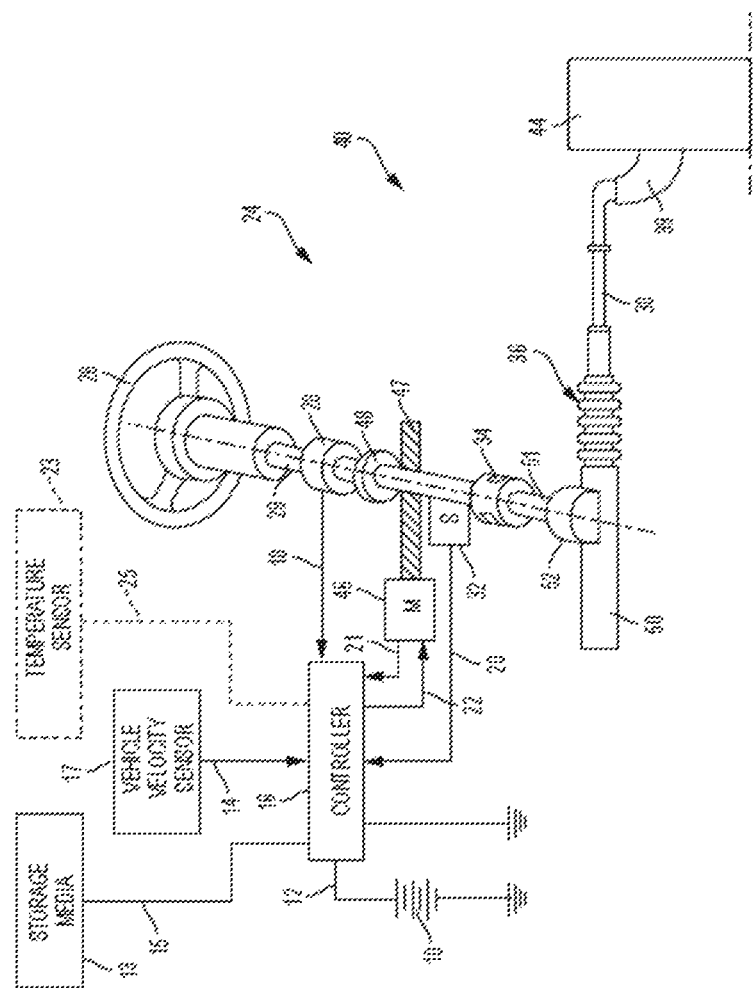
FIG. 2 is an exemplary embodiment of an electric power steering system.
Figure 3:
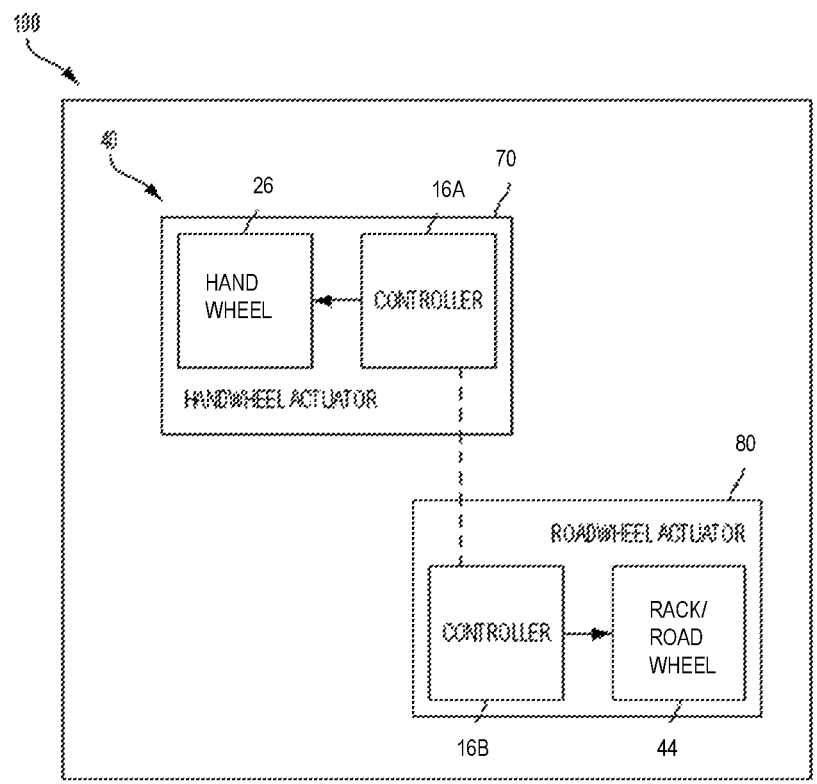
FIG. 3 is an exemplary embodiment of a steer by wire system.

The technical solutions described herein are applicable to both EPS (Electric Power Steering) and SbW (Steer-by-Wire) systems. Referring to the Figures, where the technical solutions will be described with reference to specific embodiments, without limiting same, FIG. 2 is an exemplary embodiment of an electric power steering system (EPS) 40 in a vehicle 100 suitable for implementation of the disclosed embodiments, and FIG. 3 is an exemplary embodiment of a SbW system 40 for implementation of the described embodiments. Unless specifically described otherwise, the present document refers to a steering system 40 that can be either an EPS or a SbW or any other type of steering system in which the technical solutions described herein can be used.

In FIG. 2, the steering mechanism 36 is a rack-and-pinion type system and includes a toothed rack (not shown) within housing 50 and a pinion gear (also not shown) located under gear housing 52. As the driver input, hereinafter denoted as a handwheel or steering wheel 26 is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) or tire(s) 44 (only one shown). Although a rack-and-pinion type system is described herein, the EPS in other embodiments can be a column assist EPS (CEPS), pinion assist EPS (PEPS), dual pinion assist EPS, or any other type of EPS.

Electric power steering assist is provided through the control apparatus generally designated by reference numeral 24 and includes the controller 16 and an electric motor 46, which could be a permanent magnet synchronous motor (PMSM), or a permanent magnet direct current motor (PMDC), or any other type of motor, and is hereinafter denoted as motor 46. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position $\theta$ as measured by a position sensor 32 over a prescribed time interval. For example, motor speed $\omega_m$ may be determined as the derivative of the motor position $\theta$ from the equation $\omega_m = \Delta\theta/\Delta t$ where $\Delta t$ is the sampling time and $\Delta\theta$ is the change in position during the sampling interval. Alternatively, motor velocity may be derived from motor position as the time rate of change of position. It will be appreciated that there are numerous well-known methodologies for performing the function of a derivative.

As the steering wheel 26 is turned, torque sensor 28 senses the torque applied to the steering wheel 26 by the vehicle driver. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 46, which supplies torque assist to the steering system through worm 47 and worm gear 48, providing torque assist to the vehicle steering.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 46. Controller 16 is configured to develop the corresponding voltage(s) out of inverter (not shown), which may optionally be incorporated with controller 16 and will be referred to herein as controller 16, such that, when applied to the motor 46, the desired torque or position is generated. In one or more examples, the controller 24 operates in a feedback control mode, as a current regulator, to generate the command 22. Alternatively, in one or more examples, the controller 24 operates in a feedforward control mode to generate the command 22. Because these voltages are related to the position and speed of the motor 46 and the desired torque, the position and/or speed of the rotor and the torque applied by a driver are determined. A position encoder is connected to the steering shaft 51 to detect the angular position $\theta$. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 46.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 may be located at the electric motor 46. Preferably, the temperature sensor 23 is configured to directly measure the temperature of the sensing portion of the motor 46. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

FIG. 3 depicts an exemplary SbW system according to one or more embodiments. The SbW system 40 includes a handwheel actuator (HWA) 70 and a roadwheel actuator (RWA) 80. The controller 16 is split into two blocks, a controller 16A and a controller 16B associated with the HWA 70 and the RWA 80 respectively. In other examples, the controller 16 can be distributed in any other manner.

The HWA 70 includes one or more mechanical components, such as the steering wheel 26 (handwheel), a steering column, a motor/inverter attached to the steering column either through a gear mechanism or a direct drive system. The HWA 70 further includes the microcontroller 16A that controls the operation of the mechanical components. The microcontroller 16A receives and/or generates torque via the one or more mechanical components. For example, the microcontroller 16A can send a torque command request to a motor/inverter that will generate such torque.

The RWA 80 includes one or more mechanical components, such as a steering rack coupled to a motor/inverter through a ball-nut/ball-screw (gear) or pinion gear arrangement, and the rack is connected to the vehicle roadwheels/tires 44 through tie-rods. The RWA 80 includes the microcontroller 16B that controls the operation of the mechanical components. The microcontroller 16B receives and/or generates torque via the one or more mechanical components. For example, the microcontroller 16B can send a torque command request to a motor/inverter that will generate such torque. It should be noted that in one or more examples, each wheel in the vehicle 100 includes a respective actuator that controls the position of the wheel. In such cases the RWA 80 includes multiple actuators that are controlled by a common input position command with further processing as is described herein.

The microcontrollers 16A and 16B are coupled through electrical connections that allow signals to be transmitted/received. As referred to herein, a controller can include a combination of the HWA controller 16A and the RWA controller 16B, or any one of the specific microcontrollers.

In one or more examples, the controllers 16A and 16B SbW system 40 communicate with each other through CAN interface (or other similar digital communication protocols). Guidance of the vehicle 100 that is fitted with the SbW system 40 is performed by use of the steering gear. The RWA 80 receives an electronic communication signal of rotation of the steering wheel by the driver. A driver controls the steering wheel to directionally control the vehicle 100. The angle from HWA 70 is sent to the RWA 80 which performs position control to control rack travel to guide the roadwheel. However, due to the lack of mechanical connection between the steering wheel and the road wheels, the driver is not readily provided with a feel for the road without torque feedback (unlike the case in an EPS as described earlier).

In one or more examples, the HWA 70 that is coupled to the steering column and steering wheel simulates the driver's feel of the road. The HWA 70 may apply tactile feedback in the form of torque to the steering wheel. The HWA 70 receives a rack force signal from the RWA 80 to generate an appropriate torque feel for the driver. Alternatively, the handwheel angle and vehicle speed can also be used to generate desired torque feel to the driver.

As noted earlier, the SbW and EPS described herein are exemplary, and the technical solutions described herein are applicable to any type of a steering system, and as such, unless specifically mentioned otherwise, a "steering system" herein refers to any type of steering system.

Figure 4:
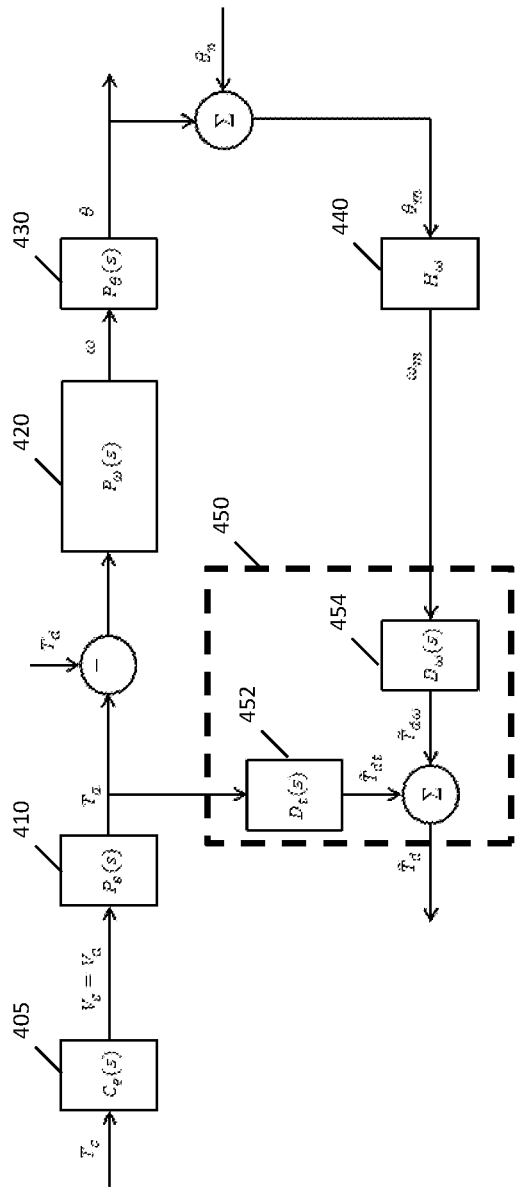
FIG. 4 depicts a position control open-loop system.

FIG. 4 depicts a block diagram of a position control open-loop system according to one or more embodiments. In the figure, the mechanical (rack and motor) plants are represented by $P_\omega$ (420) and $P_\theta$ (430) respectively, while the electrical (motor) plant is represented by $P_e$ (430). The transfer functions for the mechanical plants can be represented in terms of the cumulative inertia/and damping b as follows.

$$P_\omega = \frac{1}{Js+b}$$

$$P_\theta = \frac{1}{s}$$

Further, to simplify the description and equations herein it is assumed that $H_\omega$ (440) is an ideal derivative and thus an exact inverse of $P_\theta$ (430).

Further, the motor electromagnetic torque controller (405) is modeled by $C_e$. For the foregoing discussion, the electrical (closed-loop) dynamics are ignored, or mathematically it is assumed that $C_e P_e \cong 1$, which is a fair assumption because the electrical torque control loop is tuned to be significantly faster than the mechanical dynamics. This results in the motor torque command being substantially equal to the actual motor electromagnetic torque as follows.

$$T_c \approx T_a$$

Further, the rack force estimator (450) is represented by at least two transfer functions $D_t$ (452) and $D_\omega$ (454). The rack force estimate $\hat{T}_d$ is composed of these two transfer functions and may be mathematically represented as follows.

$$\hat{T}_d = D_t T_a + D_\omega \omega_m$$

Note that the position measurement noise is assumed to be zero (although it is shown in the figure) for the description presented here. The transfer functions $D_t$ and $D_\omega$ are obtained from a state observer for estimating the rack force ($T_d$), referred to herein as the disturbance. In one or more examples, the rack force estimator 450 includes the disturbance observer that augments the plant matrix with the disturbance (rack force) being modeled as a state with an unknown initial step input. The (augmented) plant equations, in such case, are as follows.

$$\begin{bmatrix} \dot{\omega} \\ \dot{T}_d \end{bmatrix} = \begin{bmatrix} -b/J & -1/J \\ 0 & 0 \end{bmatrix} \begin{bmatrix} \omega \\ T_d \end{bmatrix} + \begin{bmatrix} 1/J \\ 0 \end{bmatrix} [T_a]$$

$$y = Cx$$

$$[\omega] = [1 \; 0] \begin{bmatrix} \omega \\ T_d \end{bmatrix}$$

The observer equations are obtained using estimates of the plant matrices along with observer gains as follows.

$$\dot{\hat{x}} = \hat{A}\hat{x} + \hat{B}u + L(y - \hat{y})$$
$$= \hat{A}\hat{x} + \hat{B}u + L(Cx - \hat{C}\hat{x})$$
$$= (\hat{A} - L\hat{C})\hat{x} + \hat{B}u + LCx$$

$$\begin{bmatrix} \dot{\hat{\omega}} \\ \dot{\hat{T}}_d \end{bmatrix} = \begin{bmatrix} -\hat{b}/\hat{J} - L_1 & -1/\hat{J} \\ -L_2 & 0 \end{bmatrix} \begin{bmatrix} \hat{\omega} \\ \hat{T}_d \end{bmatrix} + \begin{bmatrix} 1/\hat{J} \\ 0 \end{bmatrix} [T_a] + \begin{bmatrix} L_1 & 0 \\ L_2 & 0 \end{bmatrix} \begin{bmatrix} \omega \\ T_d \end{bmatrix}$$

Here $\hat{J}$ and $\hat{b}$ represent estimated or best-known values of cumulative inertia and damping for the system.

Taking the Laplace transfer of this matrix equation, the estimated rack force is obtained as follows.

$$\hat{T}_d = \frac{-L_2/\hat{J}}{s^2 + (\hat{b}/\hat{J} + L_1)s - L_2/\hat{J}} T_a + \frac{-L_2(s + \hat{b}/\hat{J})}{s^2 + (\hat{b}/\hat{J} + L_1)s - L_2/\hat{J}} \omega$$

$$= D_t T_a + D_\omega \omega$$

In such cases the observer gains are tuned analytically to achieve specific transfer functions, or by using standard techniques such as pole placement or LQE. It should be noted that the observer described herein is for a rack-only system, it can be extended to a full steering system by changing $T_a$ to $T_a + T_h$ (handwheel torque signal) in the observer matrix. The disturbance compensation described herein is, therefore, not limited to rack-only systems.

Figure 5:
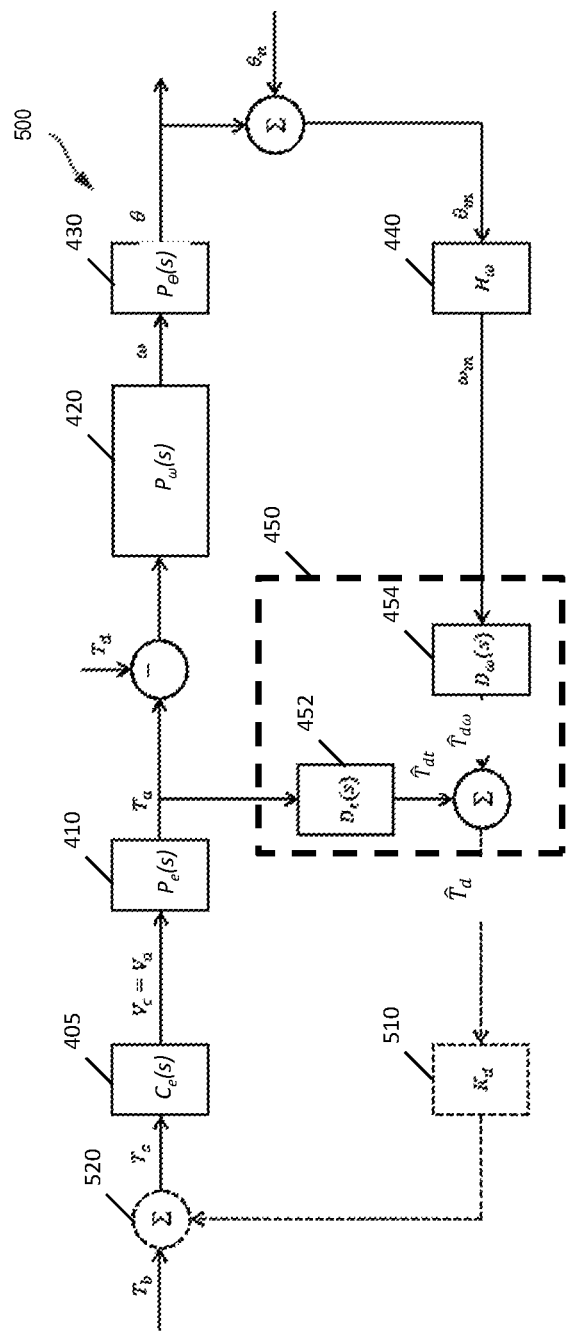
FIG. 5 depicts a block diagram of the position control open-loop system with disturbance rejection according to one or more embodiments.

FIG. 5 depicts a block diagram of the position control open-loop system with disturbance rejection according to one or more embodiments. The illustrated position control system 500 feeds the disturbance estimate, which is an estimate of the road or rack force in the steering system 40, directly at the input of the plant as an additional component of the control signal to improve the disturbance rejection response, which thereby improves the tracking performance of the position control system 500. The estimated disturbance is added (at 520) into the input torque ($T_b$) in one or more examples. The architecture used for performing base position control is not shown in the figure, because the disturbance rejection as is shown can be employed irrespective of the base control scheme used. Further, the disturbance may be scaled (510) and then fed back instead of employing unity gain feedback to introduce an additional degree of freedom in the control system. For example, the scaling module 510 can use an identity matrix so that the estimated disturbance ($\hat{T}_d$) is fed back without any substantial adjustment.

Furthermore, in one or more examples, the two transfer functions $D_t$ and $D_\omega$ are scaled individually and then fed as the disturbance feedforward term that is added (at 520) in the input torque command.

After the inclusion of the disturbance estimate $\hat{T}_d$, the effective plant from the control signal $T_b$ to the velocity output $\omega$ remains unaffected, while the response of $\omega$ due to $T_d$ changes substantially based on the plant parameter estimates. The expression for $\omega$ with the disturbance estimate feedforward term included and $K_d$ set to unity is as follows.

$$\omega = (1 - P_\omega(1-D_t)^{-1}D_\omega)^{-1}(P_\omega(1-D_t)^{-1}T_b - P_\omega T_d) = H_t T_b + H_d T_d$$

After further simplification, the two transfer matrices relating $\omega$ to $T_b$ and $T_d$ are obtained as follows.

$$H_t = (1 - P_\omega(1-D_t)^{-1}D_\omega)^{-1} P_\omega(1-D_t)^{-1}$$
$$= ((1-D_t)P_\omega^{-1} - D_\omega)^{-1}$$
$$= \frac{s^2 + (\hat{b}/\hat{J} + L_1)s - L_2/\hat{J}}{Js^3 + (b + \hat{b}J/\hat{J} + L_1/\hat{J})s^2 + (\hat{b}b/\hat{J} + bL_1 - L_2)s - L_2\hat{b}/\hat{J}}$$

$$H_d = -(P_\omega^{-1} - (1-D_t)^{-1}D_\omega)^{-1}$$
$$= -\frac{s\hat{J}(s + \hat{b}/\hat{J} + L_1)}{((Js+b)(s\hat{J}(s+\hat{b}/\hat{J}+L_1)) - L_2(\hat{J}s+\hat{b}))}$$

Considering that the parameter estimates are accurate, i.e., $J = \hat{J}$ and $b = \hat{b}$, the two transfer function expressions become as follows.

$$H_t = \frac{1}{Js + b} = P_\omega$$

-continued $$H_d = -\frac{1}{Js+b}\frac{s\hat{J}(s+\hat{b}/\hat{J}+L_1)}{s\hat{J}(s+\hat{b}/\hat{J}+L_1)-L_2} = -P_\omega G_d$$

Figure 6:
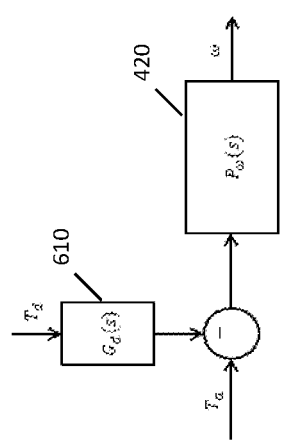
FIG. 6 depicts a position control open-loop system with unchanged effective plant according to one or more embodiments.

Accordingly, the "effective" plant (420) remains unchanged while the disturbance rejection transfer function changes. The equivalent block diagram for this condition is shown in FIG. 6. It should be noted that FIG. 6 only depicts a portion of the position controller 500 and also includes the mechanical plant. As shown, the effect of adding the disturbance estimate to the input torque is (theoretically) equivalent to having a transfer function $G_d$ (610) that cancels a portion of the rack-load or tire-load $T_d$ that is acting on the position controller because of the road surface.

Further, the transfer functions $H_d$ and $G_d$ are zero at steady state (for example, using Final Value Theorem) irrespective of the parameter estimates. Hence, steady state disturbance rejection is always achieved using the disturbance estimate that is being added to the input torque as described herein. This has several advantages including the elimination of the need of an integrator in the position controller system 500.

Figure 7:
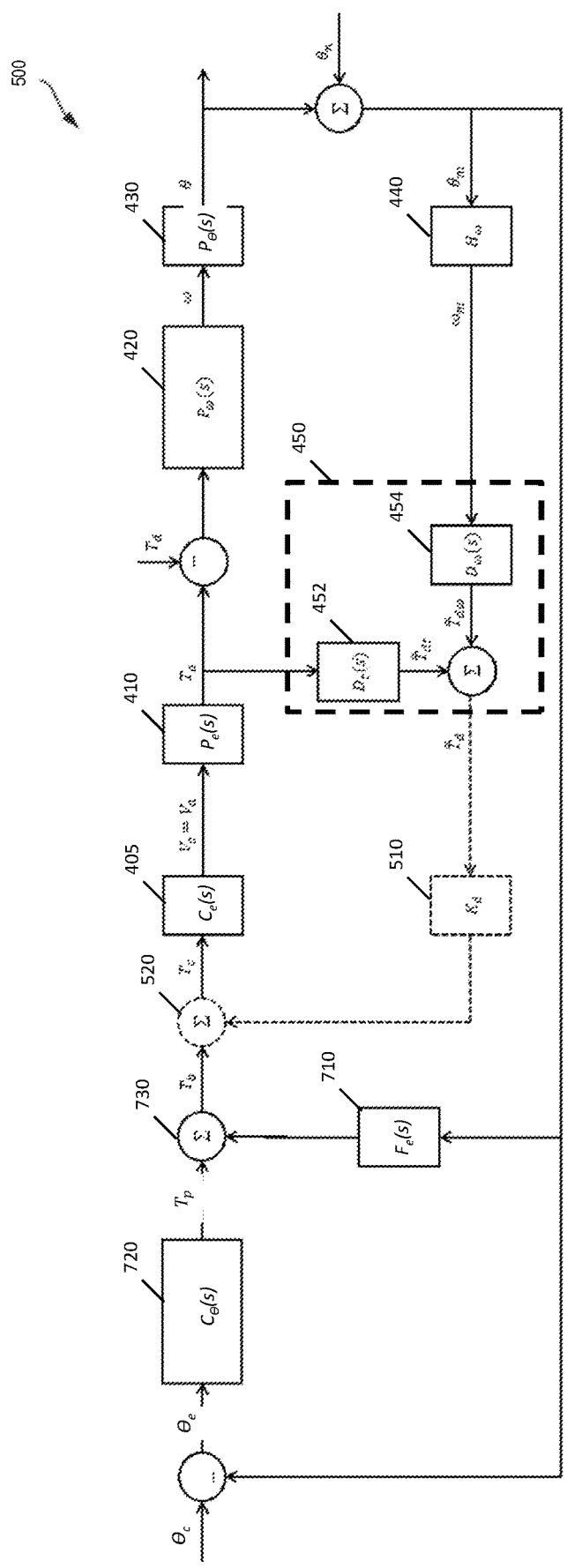
FIG. 7 depicts a position control closed-loop system with disturbance rejection according to one or more embodiments.

FIG. 7 depicts a position control closed-loop system with disturbance rejection according to one or more embodiments. The illustrated example closed loop position control scheme utilizes a proportional-integral (P) position controller 720 with state feedback 710. The state feedback compensator 710 computes a torque command based on the measured position signal ($\theta_m$) with the remaining control scheme described earlier (FIG. 5) included. The output from the state feedback compensator 710 is added (at 730) to the output torque command $T_p$ of the P controller 720. The position control command generated by the P controller is based on a position control error ($\theta_e$), which in turn, is a result of a difference between the input position control command ($\theta_c$) and the measured position of the rack ($\theta_m$). The torque commands from the P controller and the state feedback compensator are used to generate the input torque command ($T_b$).

Further, experimental and exemplary results with and without disturbance rejection as described herein indicate that in the absence of any disturbance (i.e. before rack-load acts on the system) the P position controller 720 and state feedback compensator 710 by themselves are able to achieve step command tracking. In one or more examples, with changes in the disturbance term ($T_d$), the P position controller 720 alone is unable to maintain the output at a desired set-point, however, the P position controller 720 and state feedback compensator 710 with disturbance feedforward compensation (using techniques described herein) rejects the disturbance with minimal overshoot and substantially improves the tracking performance. It should be noted that steady state disturbance rejection is achieved irrespective of modeling uncertainty or observer gain selection. Accordingly, the technical solutions described herein further facilitate improving the tracking performance by employing the disturbance feedforward compensation technique.

The technical solutions described herein addresses technical challenges associated with steering systems like Steer-by-Wire (SbW) systems that include a position controller road-wheel actuator (RWA). The position control is performed using feedback control architectures which utilize a position feedback. The tracking performance is affected adversely by the external disturbances such as steering friction, road inputs. The disturbance feedforward compensation technique described herein addresses such technical challenges and provides improved performance of the closed loop position control system. The technical solutions described herein can be employed irrespective of the base position control architecture. The technical solutions described herein further improve robustness of the system because the real-time estimated rack force is utilized for compensation. The technical solutions described herein facilitate enhancement of the disturbance rejection properties and therefore, of the position tracking performance of the control system.

The disturbance feedforward compensation is performed by determining and providing a disturbance estimation based command that is added to final torque command by the control system. In one or more examples, the disturbance estimation done using SbW rack force observer in real-time. Further, the disturbance estimation command can be modified using a gain or transfer function $K_d$.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

What is claimed is:

1. A steering system comprising:
    a position controller that generates a torque command based on an input rack-position command and a measured position command;
    a disturbance estimator that estimates, based on at least two transfer functions obtained from a state observer with an unknown initial step input, a rack force acting on a rack;
    an adder that generates an adjusted torque command by adding the rack force that is estimated into the torque command; and
    an actuator that positions the rack according to the adjusted torque command.

2. The steering system of claim 1, wherein the rack force is estimated by the disturbance estimator as a force caused by a road surface.

3. The steering system of claim 1, wherein the rack force that is estimated is modified using a gain prior to generating the adjusted torque.

4. The steering system of claim 1, wherein the disturbance estimator estimates the rack force acting on the rack based on a motor velocity of the actuator.

5. The steering system of claim 4, wherein the disturbance estimator estimates the rack force acting on the rack further based on the torque command.

6. The steering system of claim 1, wherein the input rack-position command is received based on a change in a position of a steering wheel.

7. The steering system of claim 1, wherein the input rack-position command is received from an advanced driver assistance system.

8. The steering system of claim 1, wherein the actuator that positions the rack comprises a plurality of actuators, each actuator associated with an independent rack.

9. A method comprising:
    generating, by a position controller, a torque command based on an input rack-position command;
    estimating, based on at least two transfer functions obtained from a state observer with an unknown initial step input, by a disturbance estimator, a rack force acting on a rack;
    generating an adjusted torque command by adding the rack force that is estimated into the torque command; and
    positioning, by a motor, the rack according to the adjusted torque command that is applied to the motor.

10. The method of claim 9, wherein the rack force that is estimated is modified using a gain prior to generating the adjusted torque.

11. The method of claim 9, wherein the disturbance estimator estimates the rack force acting on the rack based on a motor velocity of the motor.

12. The method of claim 11, wherein the disturbance estimator estimates the rack force acting on the rack further based on the torque command.

13. The method of claim 9, wherein the input rack-position command is received based on a change in a position of a steering wheel.

14. The method of claim 9, wherein the input rack-position command is received from an advanced driver assistance system.

15. A steering system comprising:
    a rack;
    a motor; and
    a rack positioning system configured to perform a method comprising:
        generating a torque command based on an input rack-position command;
        estimating, based on at least two transfer functions obtained from a state observer with an unknown initial step input, a rack force acting on a rack;
        generating an adjusted torque command by adding the rack force that is estimated into the torque command; and
        positioning the rack according to the adjusted torque command that is applied to the motor.

16. The steering system of claim 15, wherein the rack force that is estimated is modified using a gain prior to generating the adjusted torque.

17. The steering system of claim 15, wherein the disturbance estimator estimates the rack force acting on the rack based on a motor velocity of the motor, and the torque command.

18. The steering system of claim 15, wherein the input rack-position command is received based on a change in a position of a steering wheel.

19. The steering system of claim 15, wherein the input rack-position command is received from an advanced driver assistance system.

20. The steering system of claim 15 wherein the rack is a first rack, the motor is a first motor, the first rack coupled with the first motor for positioning the first rack, and the steering system further comprises a second rack that is coupled with the second motor for positioning the second rack.

* * * * *